Patented May 17, 1927.

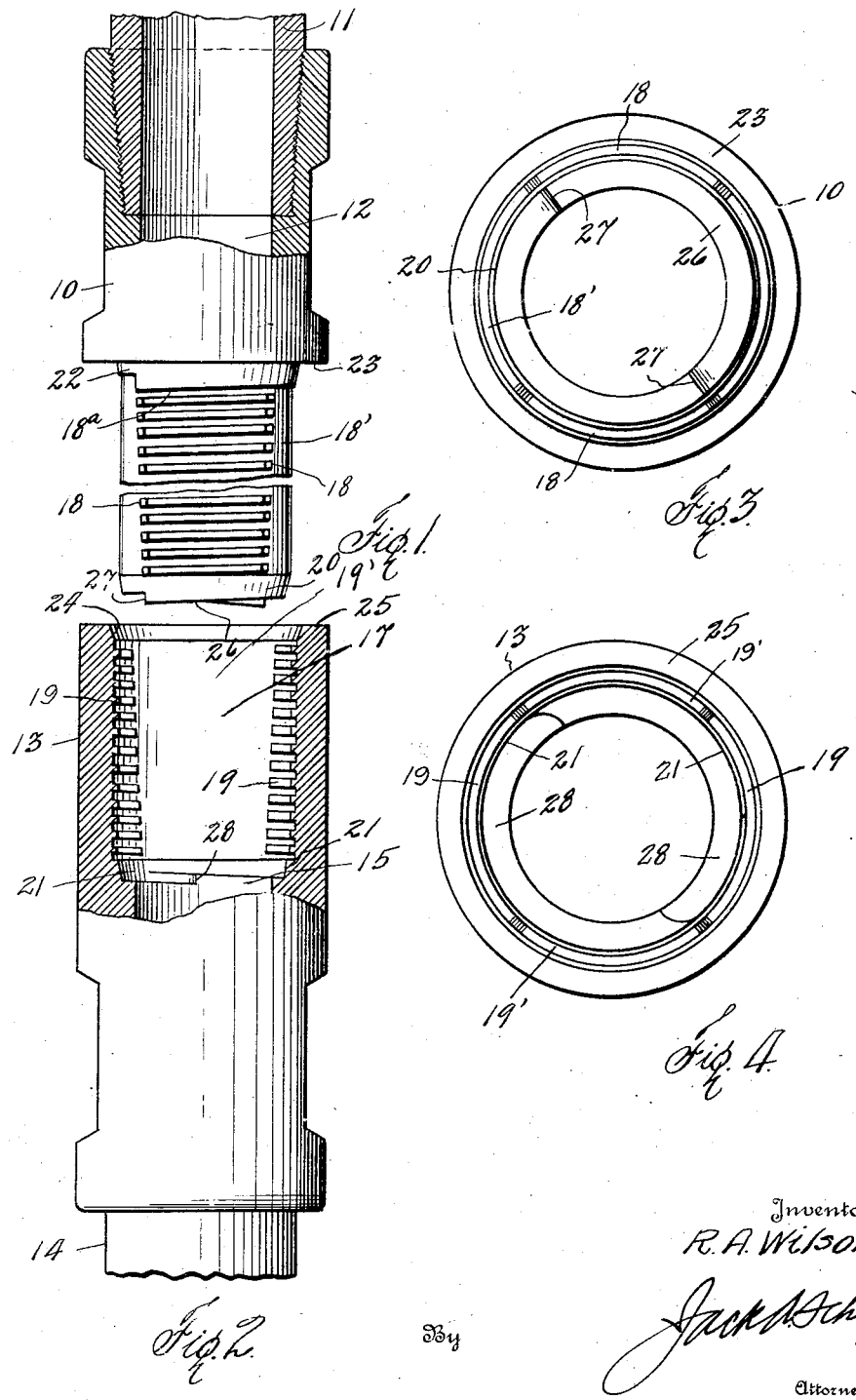

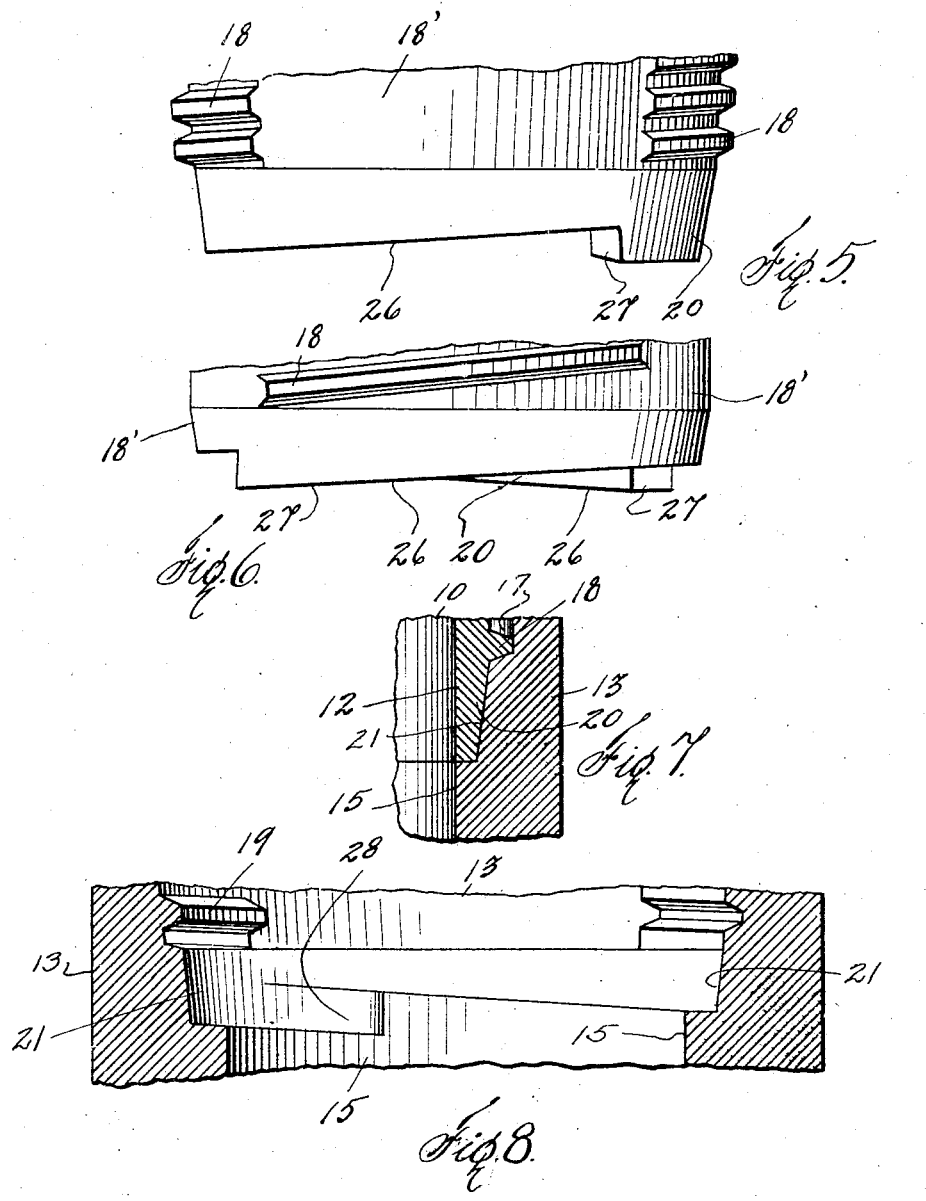

1,629,058

UNITED STATES PATENT OFFICE.

ROBERT A. WILSON, OF DALLAS, TEXAS, ASSIGNOR TO THE GUIBERSON CORPORATION, OF DALLAS, TEXAS, A CORPORATION OF DELAWARE.

THREADED COUPLING.

Application filed July 30, 1925. Serial No. 47,004.

This invention relates to new and useful improvements in threaded couplings.

The object of the invention is to provide a coupling of the box and pin type equipped with thread panels to effect a coupling and an uncoupling of the members of the joint upon a partial rotation of either member.

A particular object of the invention is to provide a straight pin and a well shaped to receive the same instead of the usual tapered pin and well.

Another object of the invention is to provide opposite thread panels and to taper the panels of the pin downwardly; while the panels of the box are tapered upwardly, thus making for easy and free insertion of the pin in the box.

A further object of the invention is to provide shoes on the lower end of the pin which are free from threads and which will co-act with seats in the box, whereby the impact and load will be sustained, borne and distributed over a substantial surface and not merely the threads.

Another object of the invention is to provide a tapered extension on the lower end of the pin which is free from screw threads and which may be tapered to center in a correspondingly shaped socket in the bottom of the well of the box; together with a collar at the top of the pin which may also be tapered, whereby amplified centering and bearing surfaces assuring a tight coupling are provided.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of the pin member of a joint constructed in accordance with my invention, Fig. 2 is a view of a box constructed in accordance with my invention, a portion being shown in elevation and a portion in section, Fig. 3 is an underside view of the pin member, Fig. 4 is a plan view of the box, Fig. 5 is an enlarged elevation of the improved pin, Fig. 6 is a similar view at right angles to Fig. 5, Fig. 7 is an enlarged vertical sectional view showing one of the shoes or extensions resting on the thread seat at the bottom of the well of the box, prior to the meshing of the threads, and Fig. 8 is a vertical sectional view taken on the line 8—8 of Fig. 4.

In the drawings the numeral 10 designates a pin member which has a screw threaded socket at its upper end to receive the usual screw threaded well tubing, stem, pipe or other tubular conductor 11, with which the joint is used. The member 10 has a longitudinal bore 12.

The pin member 10 constitutes one portion or element of the joint; while a box member 13 constitutes the other element or member 13. The lower end of the box is screw portion. The lower end of the box is screw threaded to receive the complementary portion 14 of the tubing or other conductor 11. The box has an axial bore 15. The member 10 and box 13 are screwed onto the tubular element 11 and 14 in the usual manner; it being a common practice to make the threads comparatively fine and to taper the parts. This structure may vary according to the use and the particular conductors which are to be coupled. It is the intention to screw the member 10 and the box 13 onto the parts 11 and 14 in such a manner that they will remain so connected when the joint is unscrewed or broken.

The pin is provided with mutilated threads 18 arranged in two panels each occupying approximately one-quarter of the circumference of the pin and disposed diametrically opposite each other. These panels are tapered downwardly and this provides upwardly tapered gaps 18' between the thread panels. The panels are formed of coarse threads, the convolutions of which are preferably spaced sufficiently to admit the forming of a second thread of the same pitch, intermediate said convolutions. The second thread is started diametrically opposite the first thread and it has been found expedient to carry extensions of these threads across the upper ends of the gaps to form shoulders 18a. From the foregoing it will be seen that one of the threads begins at the lower end of one panel, while the other thread begins at the lower end of the diametrically opposite panel. By this arrangement ample thread bearing is had and a coarse thread is available. It is within the scope of the invention to utilize a single thread.

The well 17 is provided with double threads 19 which are mutilated and formed into diametrically opposite panels. These panels have substantially the same width and taper as the gaps 18' between the panels of the pin. The well also has gaps 19' tapered from top to bottom. Thus when the pin is inserted in the well 17 the panels 18 will readily enter the gaps 19' and the panels 19 will freely enter the gaps 18'.

On the lower end of the pin I provide a tapered annular extension 20 fitting in a correspondingly shaped socket 21 at the bottom of the well. Above the panels 18 and the shoulder 18a is an upwardly tapered or flared collar 22 having an outwardly directed overhanging right angular shoulder 23. The well has a tapered seat 24 at its upper end for receiving the collar and a flat upper face 25 against which the shoulder rests. The lower end of the extension is cut back to form shoes 26, which have their faces or lower edges on the same pitch as the opposite thread of the following panel. This causes the entrant end of each shoe to drop off by a shoulder 27. These shoes may be cut horizontally across their faces or they may have the same bevel as the threads, but this is subject to variation.

To receive and support the shoes at the bottom of the gaps 19' in the well 17 of the box convolute seats 28 are formed contiguous to the threads 19. Each seat 28 extends convolutely below the panel in its forward path. The seats may be flat or may have the same bevel as the threads and shoes.

When the pin 16 is inserted in the box the faces of the shoes 26 will engage upon the seats 28. These faces will take the impact and with the seats will sustain the load. In order to start the threads 18 and 19 without lifting the pin after it is inserted and simply by rotating, guides at the lower ends of the gaps in the well 17 must be provided. If merely thread extensions or thread convolutions are used, then they must sustain the impact and load. But by the use of the edges or faces of the shoes 26 and the seats 28, having the same pitch as the threads, it is obvious that when the pin is rotated its thread 18 will be guided into the threads 19 in a free and easy manner.

The coupling is tightened by a quarter rotation of the member 10. This brings the extension 20 and the collar 22 into contact with the socket 21 and the seat 24, respectively, and takes up any play there might be between the parts. At the same time shoulder 23 binds on the face 25 of the box thus making a tight joint. It is obvious that as the coupling is tightened the frictional contact between the parts will be increased, whereby the box and pin members will be adequately fastened together and water-tight joint will be produced.

What I claim, is:

1. A coupling comprising in combination, a straight cylindrical pin carried by the pin member and having threads arranged in longitudinal panels on opposite sides, a tapered extension on the lower end of the pin below the threads, guide shoes on the lower edge of the extension, a box having a well shaped to snugly receive said pin and provided with threads arranged in spaced vertical panels to mesh with the threads of the pin, a tapered socket at the bottom of the well below the threads thereof for receiving the extension of the pin, and guide seats at the bottom of the socket for receiving and supporting the guide shoes.

2. A coupling comprising in combination, a pin member, a straight cylindrical pin carried by the pin member and having threads arranged in longitudinal panels on diametrically opposite sides thereof, shoes on the lower end of the pin free from threads, a box having a well shaped to snugly receive said pin and provided with threads arranged in spaced vertical panels to mesh with the threads of the pin, and seats at the bottom of the well of the box between the thread panels thereof for receiving and supporting the shoes when the pin is inserted in the box, the thread panels of the pin being tapered along their vertical edges toward the bottom of the pin.

3. A coupling comprising in combination, a pin member, a straight cylindrical pin carried by the pin member and having threads arranged in longitudinal panels on diametrically opposite sides thereof, shoes on the lower end of the pin free from threads, a box having a well shaped to snugly receive said pin and provided with threads arranged in spaced vertical panels to mesh with the threads of the pin, and seats at the bottom of the well of the box between the thread panels thereof for receiving and supporting the shoes when the pin is inserted in the box, the thread panels of the pin being tapered along their vertical edges toward the bottom of the pin and the gaps between the thread panels of the well of the box being flared upwardly for receiving the panels of the pin.

4. As a sub-combination in a coupling, a box for receiving a pin having a straight cylindrical surface provided with thread panels tapered along their vertical edges, said box having a straight cylindrical well provided with vertical thread panels having flaring gaps therebetween, said box having amplified seats at the bottom of its gaps, a socket between the seats and the thread panels, and an annular seat at the upper end of the well of the box above the thread panels.

In testimony whereof I affix my signature.

ROBERT A. WILSON.